(12) United States Patent
Tarapaski

(10) Patent No.: US 11,987,945 B2
(45) Date of Patent: May 21, 2024

(54) RODS AND ASSEMBLIES OF RODS FOR THE COLLECTION AND TRANSPORTATION OF WATER

(71) Applicant: William Ernest Tarapaski, Bangkok (TH)

(72) Inventor: William Ernest Tarapaski, Bangkok (TH)

( * ) Notice: Subject to any disclaimer, the term of this patent is extended or adjusted under 35 U.S.C. 154(b) by 0 days.

(21) Appl. No.: 17/261,628

(22) PCT Filed: Jul. 9, 2019

(86) PCT No.: PCT/CA2019/050946
§ 371 (c)(1),
(2) Date: Jan. 20, 2021

(87) PCT Pub. No.: WO2020/019060
PCT Pub. Date: Jan. 30, 2020

(65) Prior Publication Data
US 2021/0246621 A1    Aug. 12, 2021

(30) Foreign Application Priority Data

Jul. 23, 2018  (CA) .................................. CA 3012130

(51) Int. Cl.
*E02B 11/00* (2006.01)
*A01G 25/02* (2006.01)
(Continued)

(52) U.S. Cl.
CPC ............ *E02B 11/005* (2013.01); *A01G 25/02* (2013.01); *A01G 29/00* (2013.01); *E03F 1/002* (2013.01); *E01C 13/083* (2013.01)

(58) Field of Classification Search
CPC .............................. E02B 11/005; E02B 11/00
See application file for complete search history.

(56) References Cited

U.S. PATENT DOCUMENTS 3,685,298 A * 8/1972 Takanashi ............. E02B 11/005
405/36
3,797,250 A * 3/1974 Canevari ................... E02D 3/10
405/45
(Continued)

FOREIGN PATENT DOCUMENTS

KR       200396485 Y1    9/2005
KR     20050111710 A    11/2005
(Continued)

OTHER PUBLICATIONS

International Search Report, Canadian Intellectual Property Office, dated Sep. 16, 2019.
(Continued)

*Primary Examiner* — Sean D Andrish
(74) *Attorney, Agent, or Firm* — Bay State IP, LLC

(57) ABSTRACT

Certain aspects of the present invention are directed to an assembly comprising a series of rods for collecting water or transporting water which is structured to result in capillary spaces between it and other similar-shaped rods when such rods are adjacent to another. Each rod has a cross-sectional shape with one surface portion of the rod being a greater distance from the center of the rod than another surface portion of the rod. The rods are configured to be laid together in parallel in an assembly or prefabricated into an assembly to create a network of channels for the collection and transport of water by capillary action that is free from soil and debris, wherein the rods are partially in contact to create non-uniform hallow spaces.

15 Claims, 14 Drawing Sheets

(51) Int. Cl.
  *A01G 29/00*   (2006.01)
  *E03F 1/00*    (2006.01)
  *E01C 13/08*   (2006.01)

(56) References Cited

U.S. PATENT DOCUMENTS

| | | | | |
|---|---|---|---|---|
| 4,016,727 A * | 4/1977 | Osaka | E02B 11/005 | |
| | | | 405/48 | |
| 4,780,165 A * | 10/1988 | Stover | E02B 11/005 | |
| | | | 156/169 | |
| 4,995,759 A * | 2/1991 | Plowman | E02B 11/005 | |
| | | | 138/111 | |
| 5,564,857 A * | 10/1996 | Schluter | E02B 11/005 | |
| | | | 405/36 | |
| 9,404,232 B2 * | 8/2016 | Tarapaski | F16L 1/028 | |
| 2003/0118402 A1 | 6/2003 | Sakamoto | | |
| 2011/0056062 A1 * | 3/2011 | Bussey, III | E02B 11/005 | |
| | | | 29/428 | |

FOREIGN PATENT DOCUMENTS

| | | | | |
|---|---|---|---|---|
| KR | 2011005077 | * | 5/2011 | |
| KR | 20110050577 | * | 5/2011 | |
| WO | 2013021333 A1 | | 2/2013 | |

OTHER PUBLICATIONS

Written Opinion, International Searching Authority, Canadian Intellectual Property Office, dated Sep. 16, 2019.
International Preliminary Report on Patentability, Canadian Intellectual Property Office, dated Oct. 16, 2020.

* cited by examiner

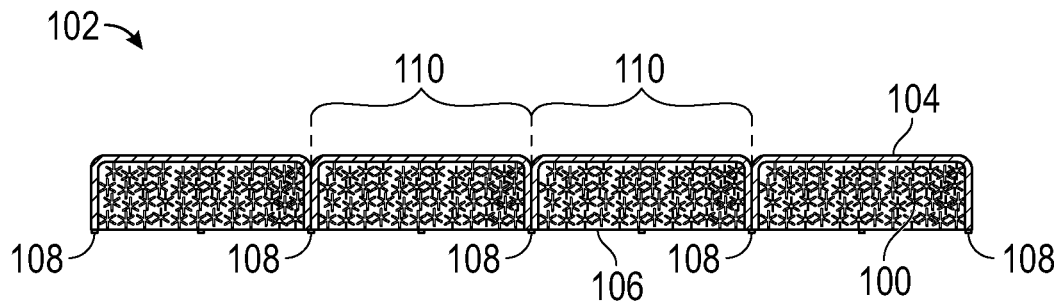
FIG. 15
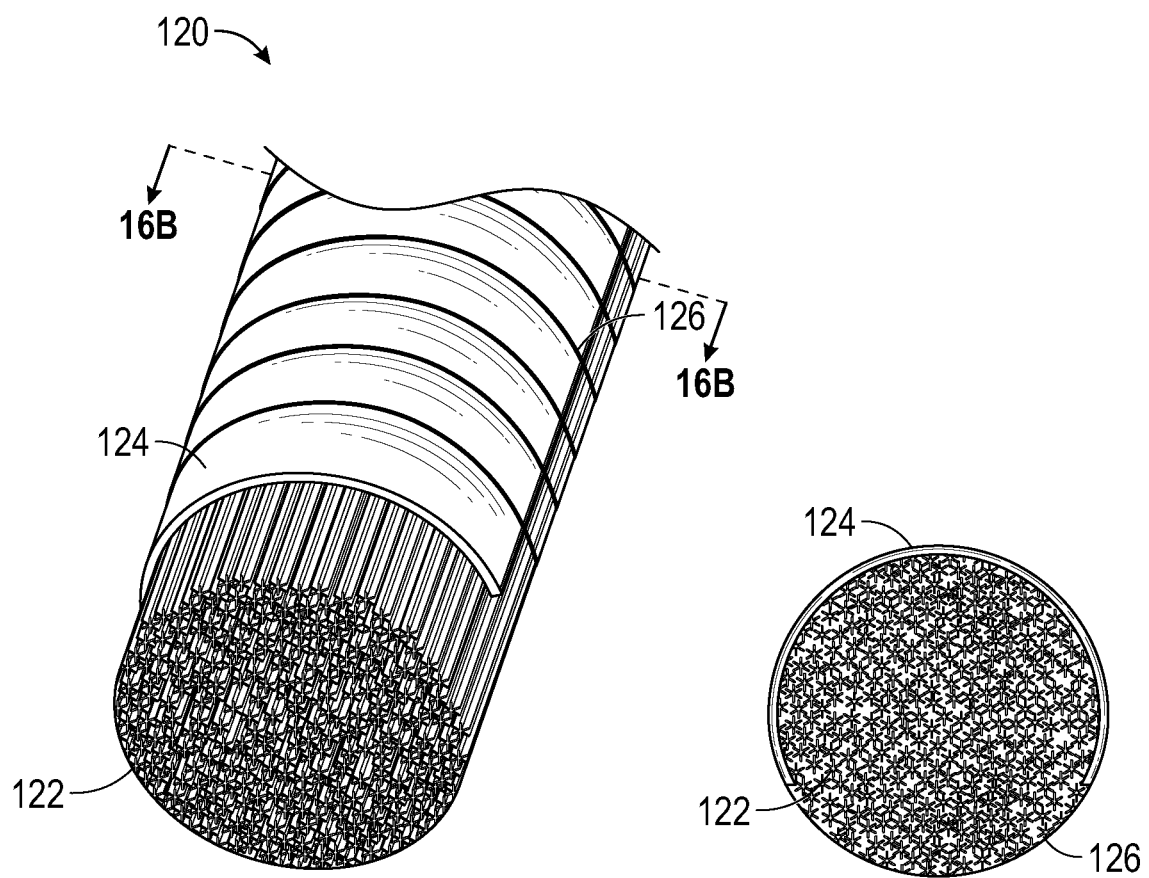
FIG. 16A
FIG. 16B

RODS AND ASSEMBLIES OF RODS FOR THE COLLECTION AND TRANSPORTATION OF WATER

CROSS REFERENCE TO RELATED APPLICATION

This application is for entry into the U.S. National Phase under § 371 for International Application No. PCT/CA2019/050946 having an international filing date of Jul. 9, 2019, and from which priority is claimed under all applicable sections of Title 35 of the United States Code including, but not limited to, Sections 120, 363, and 365(c) and which in turn claims priority under 35 USC 119 to Canadian Patent Applications No. 3012130 filed on Jul. 23, 2018.

FIELD OF THE INVENTION

This invention relates to a water collection and transportation apparatus and method. In particular, this invention relates the use of assemblies of shaped rods having spaces between the rods for the efficient collection of particle free water from soil by capillary action and/or for the transport of particle free water to a discharge point.

BACKGROUND OF THE INVENTION

Systems for collecting and distributing water are critical in many different industries and fields. For instance, sports fields and golf courses require water drainage systems that collect and move water away from wet areas. Such drainage systems typically utilize perforated pipes that are laid below the surface which are prone to clogging.

Water resources are also increasingly under pressure from various interests worldwide. Traditionally, irrigation systems utilize large pumps to spray vast quantities of water, blanketing an area. The practice does not selectively water desired areas or plants and therefore wastes large quantities of water. Additionally, a significant percentage of water loss due to evaporation can occur with such current irrigation systems. In the agricultural field, and especially in arid regions, the efficient use of water is highly desired to produce maximum yields with a limited water supply.

Various behaviours of water are known. For instance, it is known that surface water travels by flow. Flow is simply the effect of gravity as the water flows to the low point where flow will stop. Flow occurs in nature such as in rivers and streams and occurs in manmade structures such as in ditches, canals, and trenches. Flowing water dislodges and carries soil particles which settle when the flow is reduced or stopped. The rate of settling is controlled by the weight of the particles and the velocity of the flow. Flow and the accumulation of particle settlement can result in blockages of structures.

Water below the surface of the ground, called groundwater, travels through the soil by capillary action. The water permeates though all soil types without blockages, primarily because with capillary migration, there is no flow to dislodge and transport soil particles.

The collection of groundwater by excavating trenches and installing perforated pipes, with or without drain rock, simply transfers surface water behaviours below the surface, along with the clogging problems associated with flow. Current groundwater drainage solutions are an attempt to force a solution that is against the principles of nature, and clogging problems can be expected. Moreover, a known problem is that there is a considerable migration of soil particles into the voids created by the larger drain rock aggregate. Over time, the voids will become filled with smaller particles, blocking flow through the voids, and the movement of water will revert to its natural state, migration by capillary action.

Except for filters, there has been little innovation to drainage methods. However even filters, as expected, clog from the particles that they block and eventually require replacement. Typically, filters cannot be changed without a complete reconstruction which is often a more expensive undertaking than the original construction.

Since flow is a surface behaviour, the installation of flow mechanisms underground will cause erosion resulting in blocked pipes and filters as the displaced particles build up within the structure.

Limited drainage systems that do not utilize flow are known. For example, U.S. Pat. No. 5,934,828 to Hu et al. discloses an assembly and method for collecting water by capillary action. The assembly consists of a wide drain belt having a plurality of separated slots and notches on the bottom surface. Since the top surface of the structure is sealed, the water must access the internal channels through slots connected to the channels along the bottom surface. The vertical migration of the water into channels separates any soil particles from the water since water migration by capillary action cannot transport soil particles when the soil is in a settled state. Collection slots face downwards to intercept the rising water from below, consistent with the natural behaviour of water.

While the wide belt assembly advanced the effective collection of water free of soil particles, it also had limitations. The small size of the collection channels limited both the capacity for the collection and discharge of water and the transport of water to a discharge point. Preparation of a drain belt and pipe assembly also required extensive time and effort. Slots must be cut into the collection pipe, the free end of the drain belt must be sealed (to prevent fine soil particles from entering into and blocking channels within the drain belt), and the sealing mechanism must be installed around the interface. Additionally, the drain belt of the prior art is thin and soft, which means that it requires proper support. The complicated contouring and compaction requirement is often not appreciated by installation teams which results in excessive settlement after installation, negative slope, and poor performance.

Other drainage products are also available. Some of such products are described as passive capillary products and may involve different layers of fiberglass fibers, stainless steel mesh, and geotextiles. While such products can collect and transport water by capillary action, there is no arrangement to separate soil particles from the water. These products can therefore be better described as a wick and additionally a filter. A wick is a more suitable term since the system performs similar to traditional wicks, such as in a coal oil lamp, wherein a liquid is transported in a clean environment without the influence of soil particles or other contaminants.

While fiberglass, stainless steel, or a geotextile may be a better choice of materials for wicks to withstand exposure to water, the overall construction, function, and performance is still a wick. Over time, fine soil particle will fill and block the pore space of the wick and reduce its performance. The migration rate of water will decrease as the pore space is contaminated by soil particles, and ultimately, the clogged wick will perform similarly to the surrounding soil.

U.S. Pat. No. 9,404,232 to Tarapaski discloses a method for water collection by capillary action using an array of spaced rods. Rather than using an internal cavity which is very limiting with regards to capacity, the water is collected in the spaces between parallel members. Additional layers of spaced rods can be combined to greatly increase the capacity of the assembly in both the water collection and transport functions.

While the principle of parallel spaced rods and layers of spaced rods works well, manufacturing the assembly disclosed in Tarapaski on a large scale is impractical from a cost perspective. A complex array of spacing and joining methods coupled with the incompatibility of container shapes to normal pipe networks makes it unlikely that this assembly will be manufactured and used to any significant degree.

U.S. Patent Application Publication No. 2012/0230767 A1 to desGarennes et al. discloses a system that is a slight medication of mole drains. However, the desGarennes system functions essentially as a wick and uses a filter that will ultimately trap soil particles and lead to clogging problems.

It is therefore an object of this invention to provide a water collection and transportation system that overcomes the clogging problems associated with perforated pipes and other drainage systems.

It is another object of this invention to provide a water collection and transportation system that both has a high capacity and is simple to manufacture.

It is another object of this invention to provide a water collection and transportation system that is easy to assemble and install and that may be used in a variety of applications.

It is another object of this invention to provide a water collection and transportation system that avoids the loss of water due to evaporation in an irrigation application.

It is yet another object of this invention to provide a water collection and transportation system that acts as a primary filter in obtaining clean water from an unclean source.

These and other objects will be better understood by reference to this application as a whole. Not all of the objects are necessarily met by all embodiments of the invention described below or by the invention defined by each of the claims.

SUMMARY OF THE INVENTION

The invention comprises a rod used for the collection and/or transportation of water wherein the rod is structured to maintain spacing with other similar-shaped rods. The rods may be laid in a trench, connected to a pipe, bound in prefabricated units, or arranged in a round shape for the collection and transport of water by capillary action. Since groundwater can move upwards by capillary action from the bottom surface of an assembly of such rods, the collected and transported water is free from soil and debris. The spacing between adjacent rods results in a system having a high collection and discharge capacity.

In one aspect, the invention comprises a rod for collecting water or transporting water, the rod having a cross-sectional shape that extends along a length of the rod. The cross-sectional shape has a centre, a first surface portion a first distance from the centre, and a second surface portion a second distance from the centre. The second distance is greater than the first distance.

The cross-sectional shape may further comprise a series of extensions extending outwards from the centre.

In another aspect, the cross-sectional shape may be a star and the star may have six points.

In another aspect, the rod comprises a web and two flanges. One flange is connected to a first end of the web and the other flange is connected to a second end of the web. The two flanges may be curved inwardly.

In another aspect, the cross-sectional shape may be a cross.

In another aspect, the cross-sectional shape may be a square. The rod may be twisted such that the square lies at different angles along the length of the rod.

In another aspect, the cross-sectional shape is an oval.

In another aspect, the cross-sectional shape is a circle having one or more protrusions.

In another aspect, a rod for collecting water or transporting water has crimps along a length of the rod.

In a further aspect, the invention comprises an assembly for collecting water or transporting water. The assembly comprises a series of rods. Each of the rods has a cross-sectional shape that extends along a length of the rod. The cross-sectional shape has a centre, a first surface portion a first distance from the centre, and a second surface portion a second distance from the centre. The second distance is greater than the first distance.

The assembly may further comprise a cover placed over the series of rods and backfill placed over the cover. The series of rods, the cover, and the backfill are placed in a trench.

In another aspect, the assembly further comprises a pipe having a slot and a cover over at least the top of the series rods. At least a portion of the series of rods passes through the slot in the pipe.

In another aspect, the series of rods has a side and an end that is outside of the pipe. The cover extends over the side and over the end.

In another aspect, the assembly comprises a mesh and a cover connected to the mesh along at least two lengths of the cover and the mesh so as to create at lease one fillable segment between the mesh and the cover. The series of rods are within the at least one fillable segment.

In another aspect, the assembly comprises a cover over the series of rods and the assembly is cylindrical in shape.

In a further aspect, the assembly further comprises a filament wrapped around the cover and the series of rods.

In another aspect, the bottom portion of the series of rods is uncovered.

In a further aspect, the cover is a geotextile cover.

In a further aspect, the cover is an impermeable cover.

In another aspect, the assembly comprises a cover that wraps around a length of the series of rods and the assembly is cylindrical in shape.

In a further aspect, the assembly is connectable to a pipe using a standard pipe fitting.

The foregoing may cover only some of the aspects of the invention. Other and sometimes more particular aspects of the invention will be appreciated by reference to the following description of at least one preferred mode for carrying out the invention in terms of one or more examples. The following mode(s) for carrying out the invention are not a definition of the invention itself, but are only example(s) that embody the inventive features of the invention.

BRIEF DESCRIPTION OF THE DRAWINGS

At least one mode for carrying out the invention in terms of one or more examples will be described by reference to the drawings thereof in which:

FIG. 15 is a cross-sectional view of the manufactured assembly of rods shown in FIG. 14 taken along line 15-15;

FIG. 16A is a perspective view of another assembly of rods having a cover and bound with a filament;

FIG. 16B is a cross-sectional view of the assembly of rods shown in FIG. 16A taken along line 16B-16B;

DETAILED DESCRIPTION OF AT LEAST ONE MODE FOR CARRYING OUT THE INVENTION IN TERMS OF EXAMPLE(S)

The inventor has tested an exact model of the most common drainage assembly, namely a perforated pipe surrounded by drain rock. The test revealed results that are inconsistent with expectations. A model with holes in the bottom was used to indicate when water passed through the testing assembly instead of being collected in the perforated pipe. During the test, despite a steady steam of water coming out of the bottom of the model, there was no water in the pipe. An actual construction of a drainage pipe confirmed that water does not enter the pipe to any significant level; instead, the water flows through the drain rock surrounding the pipe. The results are consistent with flow behaviour of water.

Water can only enter the perforated pipe when the flow path becomes blocked and the groundwater level rises. The rising water creates pressure to force the water through the perforations in the pipe. This observed behaviour verifies that the source for drainage collection is from below and that collection assemblies should be oriented to intercept a rising water table rather than migration from above.

Water collection by capillary action eliminates clogging problems inherent with systems using pipes with holes and perforated pipes with filters. Two key factors are that the top must be covered to prevent particles from accessing and blocking the channels from above, and the water must rise into the channels by capillary action to separate any soil particles from the water.

A factor which separates water collection assemblies from assemblies which can be categorized as wicks is the addition of a cover over at least the top portion of the assembly. The cover prevents soil particles from filtering down or being delivered into the spaces created for capillary collection by water under the influence of gravity. Water must enter from below the assembly by capillary action, and since water rising by capillary action cannot transport soil particles, only clean water enters the assembly.

The cover may be a solid material, however, a flexible material, such as geotextile, can be advantageous. A geotextile can act as a filter so that water may also enter from a location along the assembly (until the pore spaces are blocked with particles and would then function as a solid cover), and it increases the flexibility of the assembly, making it adaptable to many different applications.

Rods for Water Collection or Water Transportation with Improved Spacing

An improved assembly for water collection and transport comprises continuous rods which guarantee a high ratio of spaces without the need for a separate apparatus for spacing purposes. Such an assembly is significantly easier to manufacture and install compared to prior art rod assemblies.

Figure 1A:
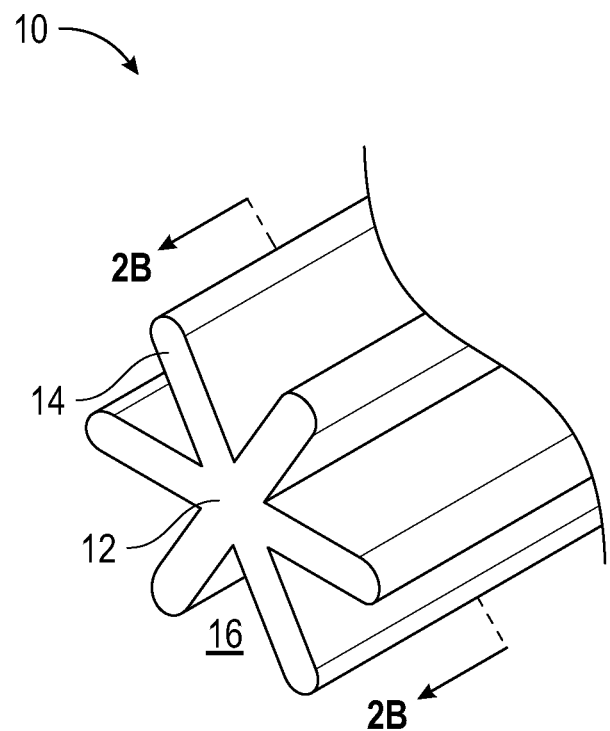
FIG. 1A is a perspective view of a rod according to one embodiment of the invention.
Figure 1B:
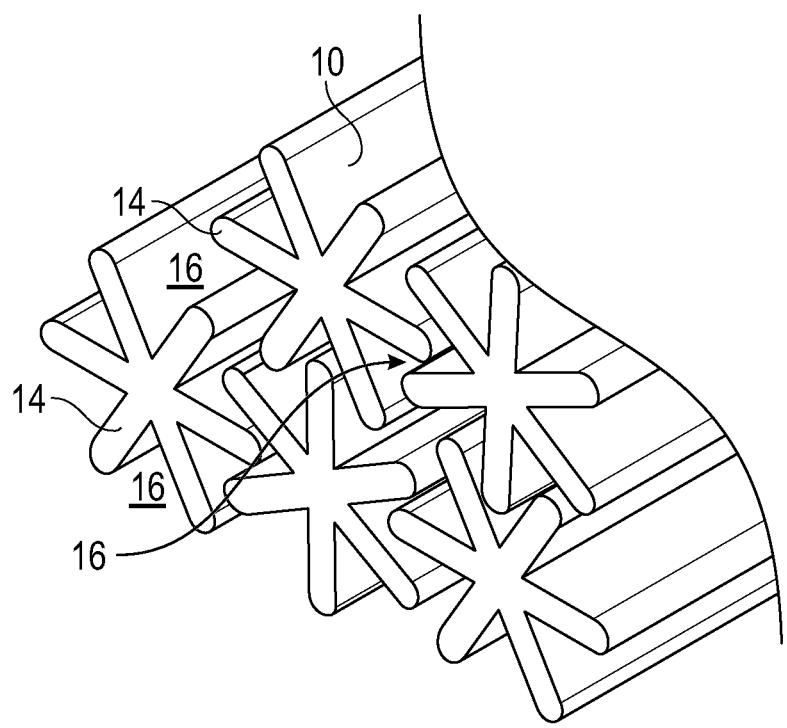
FIG. 1B is a perspective view of an assembly of rods that includes the rod shown in FIG. 1A and other similar shaped rods.
Figure 2A:
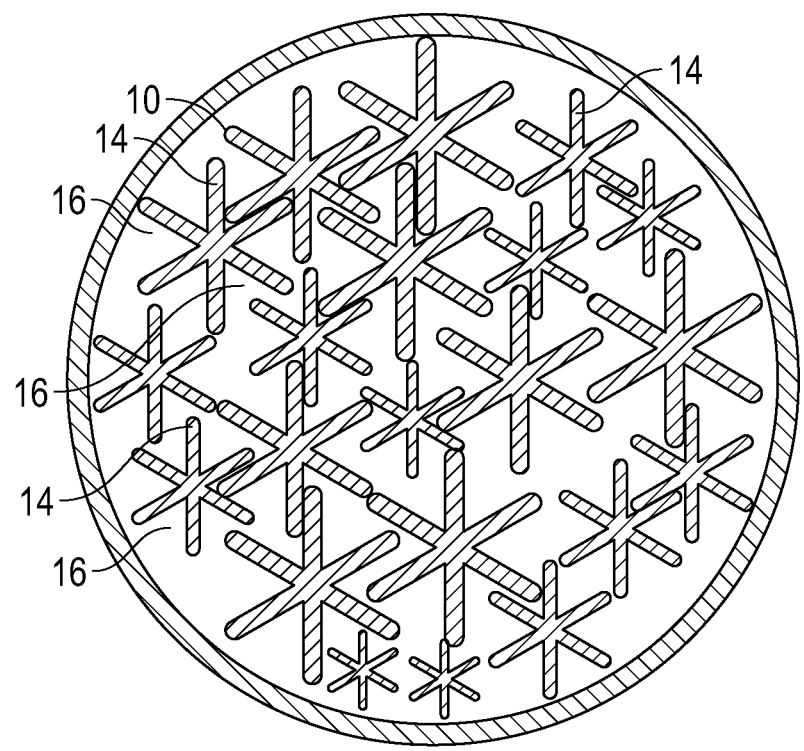
FIG. 2A is a cross-sectional view of an assembly of rods that includes the rod shown in FIG. 1 and other similar shaped rods.

FIGS. 1A, 1B, 2A, and 2B show one embodiment of the invention in which rod 10 is generally star-shaped. The star-shaped rod 10 shown has a center 12 and extensions 14. While rod 10 is shown as having six extensions 14, an alternate number of extensions is possible. Gaps 16 between adjacent extensions 14 provide space for water to travel along the rods by capillary action. As shown in FIG. 1B and FIG. 2A, the space in gaps 16 are largely maintained in a series of star-shaped rods 10 bunched together.

Figure 2B:
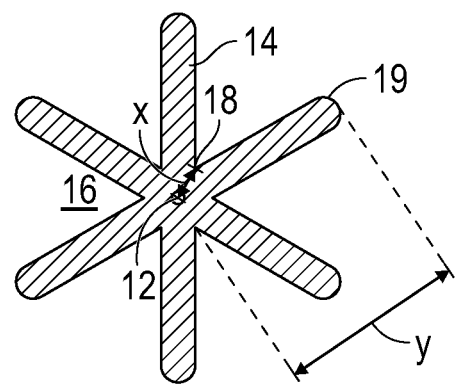
FIG. 2B is a cross-sectional view of the rod shown in FIG. 1A taken along line 2B-2B.

Now referring to FIG. 2B, the rod 10 has a first surface portion 18 (between extensions 14) that is a distance x from the centre 12. The rod 10 also has a second surface portion 19 (on one extension 14) that is a greater distance y from the centre 12.

The star-shaped rods 10 may have a 6-millimeter diameter. It will be appreciated that an assembly of smaller diameter rods having a lower capacity and which result in a higher capillary rise than an assembly of 6-millimeter diameter rods may be used. Likewise, an assembly of larger diameter rods having a higher capacity but lower capillary rise than an assembly of 6-millimeter diameter rods may be used. Furthermore, an assembly consisting of rods having differing diameters is possible as shown in FIG. 2A.

Using 6-millimeter diameter star-shaped rods, the inventor found that when aligned parallel to each other, bunched, and placed in coloured water, such star-shaped rods will show approximately a 9-millimeter rise of the water into the rod assembly. In comparison to the internal cavity method demonstrated in U.S. Pat. No. 5,934,828 to Hu et al., the collection and discharge capacity of the star-shaped assembly is more than 600% greater. Water transport through the rod assembly is also more than 600% greater, allowing for a much longer collection length before discharge.

Figure 3A:
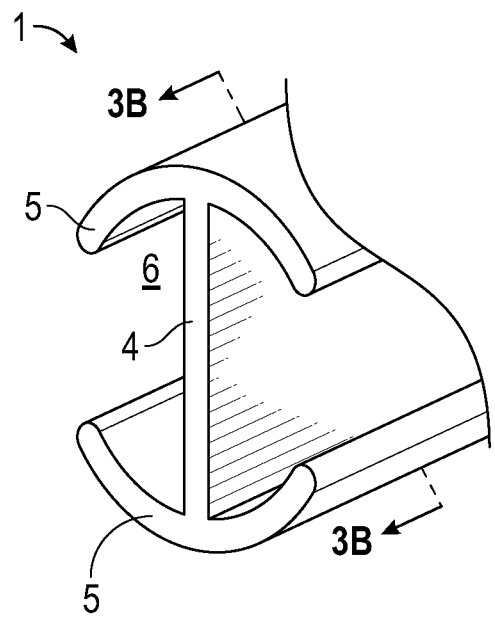
FIG. 3A is a perspective view of a rod according to second embodiment of the invention.
Figure 3B:
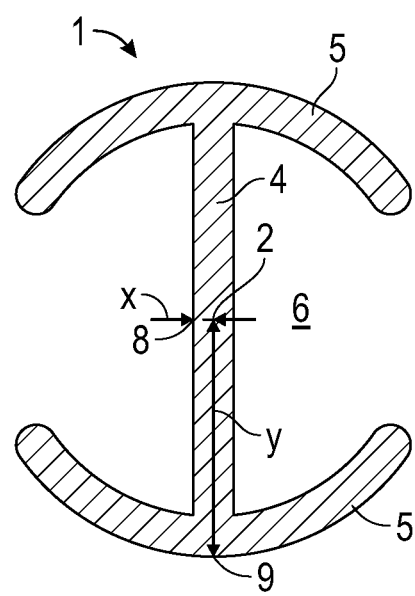
FIG. 3B is a cross-sectional view of the rod shown in FIG. 3A taken along line 3B-3B.

FIGS. 3A and 3B shows an alternate I-shaped rod 1. Rod 1 has a web 4 and upper and lower flanges 5. Flanges 5 are preferably inwardly curved. Halfway up the web of the I-shaped rod 1 is a first surface portion 8 that is a distance x from the centre 2 of the rod. A second surface portion 9 located on one of the flanges 5 is a greater distance y from the centre 2 of the rod.

The inventor has found that the star-shaped rod 10 shown in FIG. 2B when assembled together with other rods having the same or similar shapes and sizes effectively creates an assembly that has significant space between the rods for water collection and requires much less raw materials to manufacture than existing circular-shaped rods. The same is true of the I-shaped rod 1 shown in FIG. 3B.

Figure 3C:
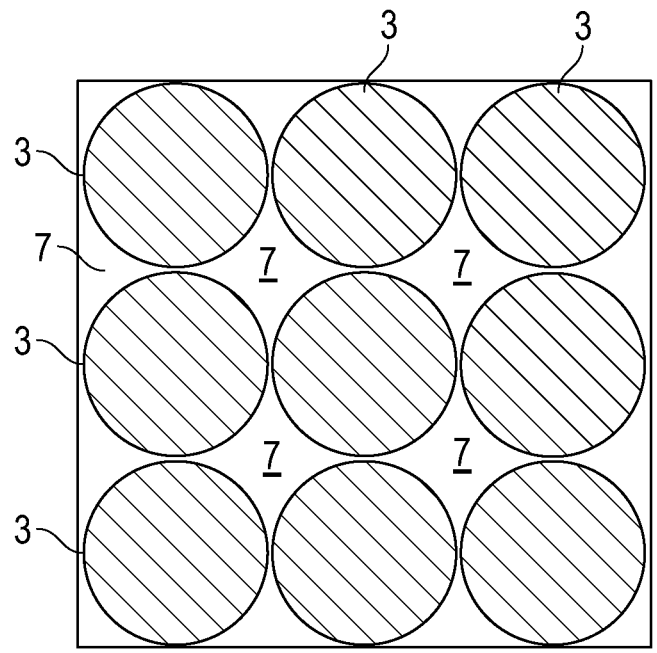
FIG. 3C is a partial cross-sectional view of an assembly of rods having a circular cross-sectional shape and arranged in layers.
Figure 3D:
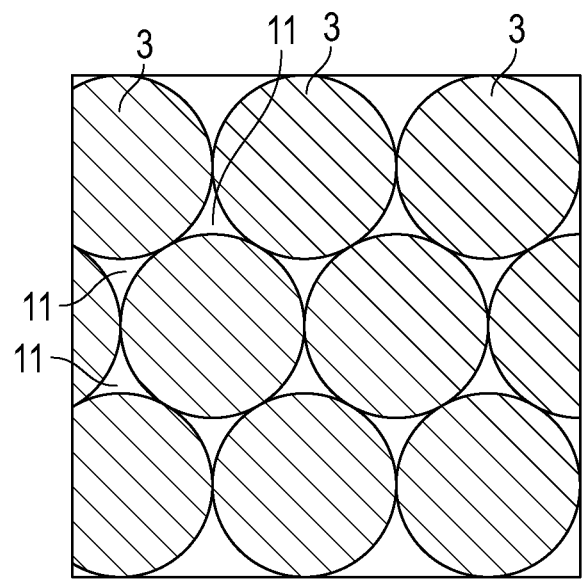
FIG. 3D is a partial cross-sectional view of an assembly of rods having a circular cross-sectional shape and arranged in staggered layers.
Figure 3E:
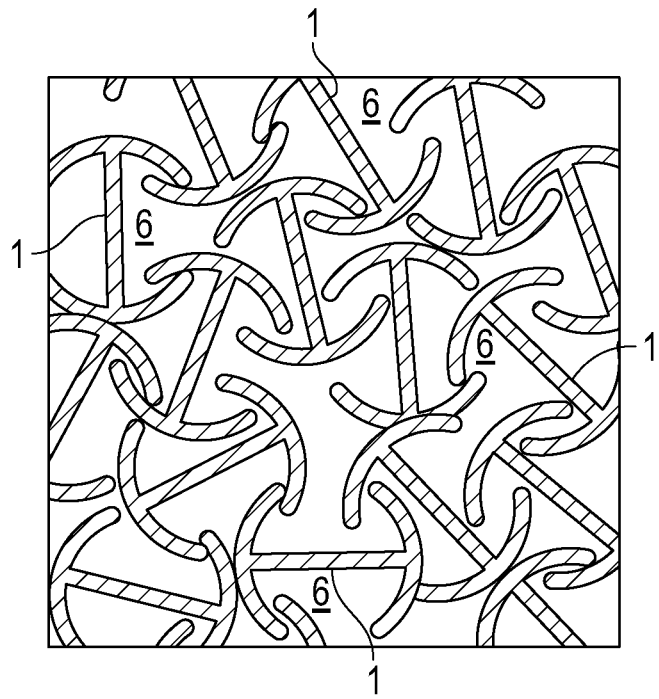
FIG. 3E is a partial cross-sectional view showing an assembly of rods having a cross-sectional shape according to the second embodiment of the invention.

The differences in the spaces between the rods can be seen in the examples shown in FIGS. 3C, 3D, and 3E wherein FIG. 3C shows layered circular-shaped rods 3 having spaces 7, wherein FIG. 3D shows layered and staggered circular-shaped rods 3 having spaces 11, and wherein FIG. 3E shows an assembly of I-shaped rods 1 having much greater spaces 6. Assuming ideal interlocking of the I-shaped rods 1, the area for water collection and transportation may be more than 300% greater compared to layered circular-shaped rods of the same diameter.

The circular-shaped rods as disclosed in U.S. Pat. No. 9,404,232 to Tarapaski are also fixed in layers (such as by setting one end of the rods in resin) and typically housed within a rigid container. Providing adequate spacing between such rods and assembling the containers is complicated, time-consuming, and expensive. Different sizes of rods will also require new tooling which may be cost prohibitive.

In contrast, the rods of the present invention, including star-shaped rods 10 and I-shaped rods 1 require intimate contact. Instead of the creation of spaces between prior art rods during the assembly of larger manufactured products, the spaces for the collection and transportation of water in the present invention are formed during the primary manufacturing of the rods. As adjacent rods will contact one another, there is no requirement for a separate spacing assembly or spacing step in the manufacturing process. Changes in the size and shape of rods can also be made easily by changing the mold and the rods can be easily cut to desired lengths. The rods of the present invention also do not require housing and can easily accommodate height and direction inconsistencies.

While rod shapes that result in assemblies with greater spaces for water collection (and less mass/material to manufacture) is desired, assemblies of rods having spaces that are too large will have a reduced capillary rise that results in lower utilization rates for the upper layers of rods. It will be appreciated that in addition to the star-shaped rod 10 and I-shaped rod 1 described above, other rod shapes that balance the spaces for the capacity to collect and transport water and the desire for a high capillary rise may be used.

Figures 4, 5:
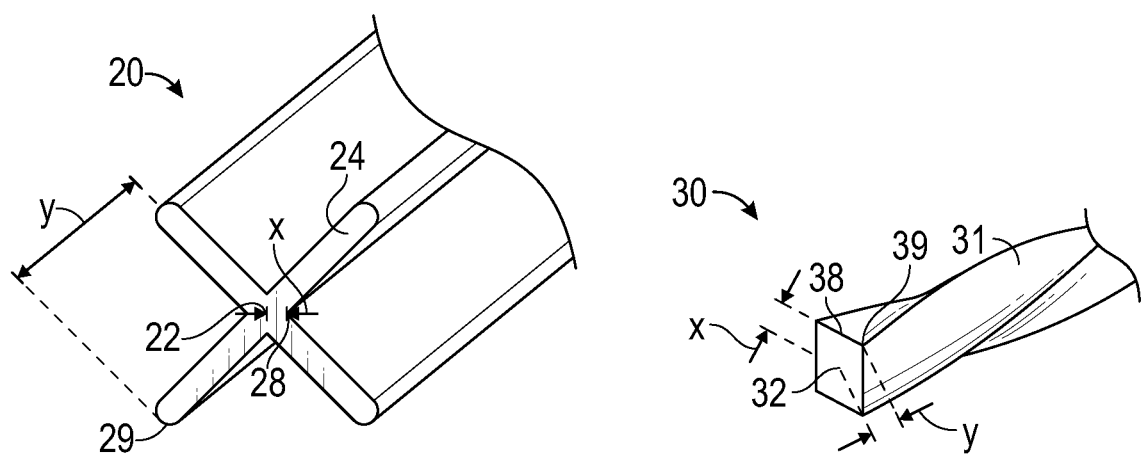
FIG. 4 is a perspective view of a rod according to third embodiment of the invention.
FIG. 5 is a perspective view of a rod according to fourth embodiment of the invention.

FIG. 4 shows an alternate cross-shaped rod 20 having a centre 22 and four extensions 24. Similar to the rod 10, distance x between a first surface portion 28 and the centre 22 is less than distance y between a second surface portion 29 and the centre 22.

FIG. 5 shows another rod 30 having a square-shaped cross section. Rods 30 are twisted so that walls 31 of adjacent rods cannot bear flatly upon one another. In other words, the twisting ensures that there will be space for water to travel between adjacent rods 30 even if they are bunched tightly together. Rod 30 also has a first surface portion 38 (at a distance x from the centre 32) and a second surface portion 39 (at a distance y from the centre 32) where distance x is less than distance y.

Figure 6:
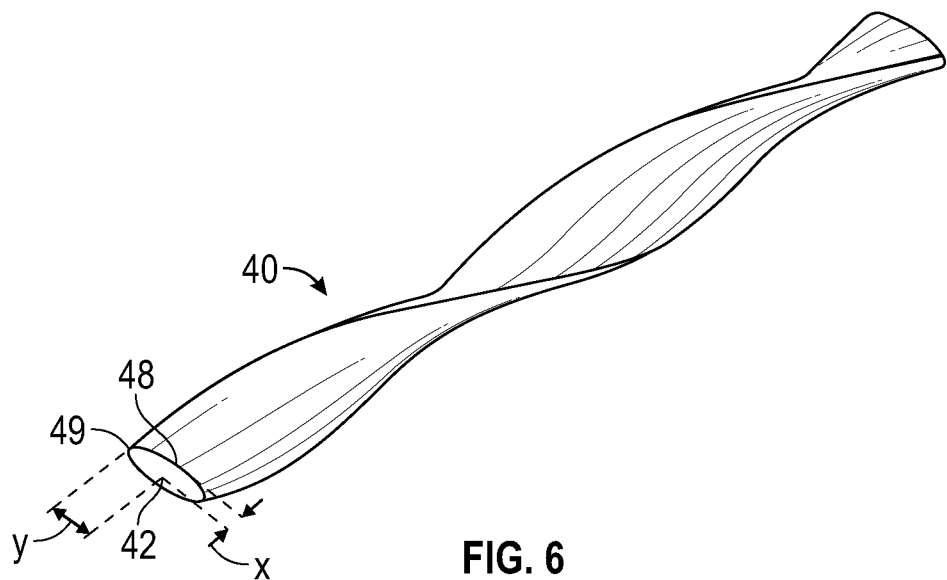
FIG. 6 is a perspective view of a rod according to fifth embodiment of the invention.

FIG. 6 shows yet another rod 40 that has an oval-shaped (or oblong-shaped) cross section. Rod 40 is preferably twisted and also has a surface portion 49 that is a greater distance from the centre 42 than surface portion 48 (as shown in the drawing using distances x and y).

Figure 7:
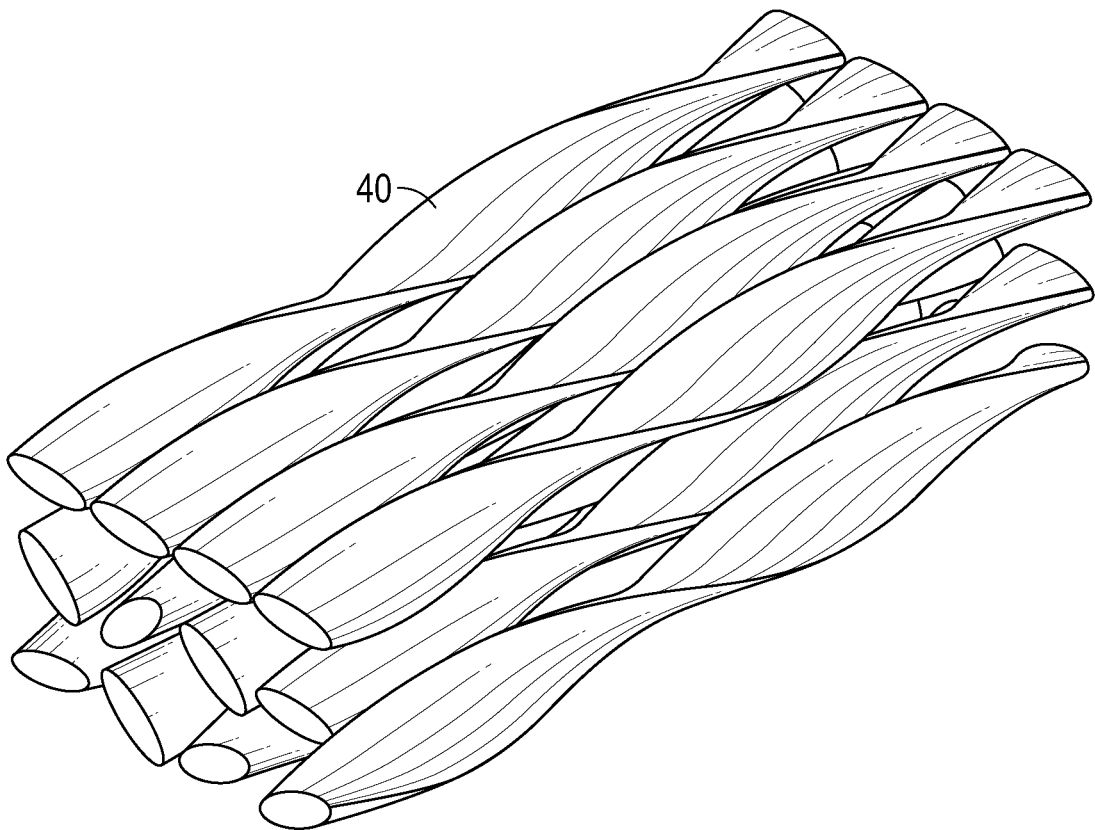
FIG. 7 is a perspective view of an assembly of rods that includes the rod shown in FIG. 6 and other similar shaped rods.

In an assembly, the rods 40 can be placed in various orientations. As a result of the oval-shape and the twisting, gaps between the rods 40 will be present to provide a space for water to travel as shown in FIG. 7.

Figure 8:
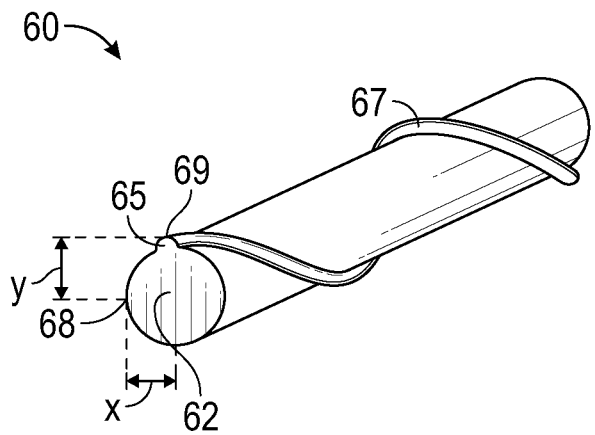
FIG. 8 is a perspective view of a rod according to sixth embodiment of the invention.
Figure 9:
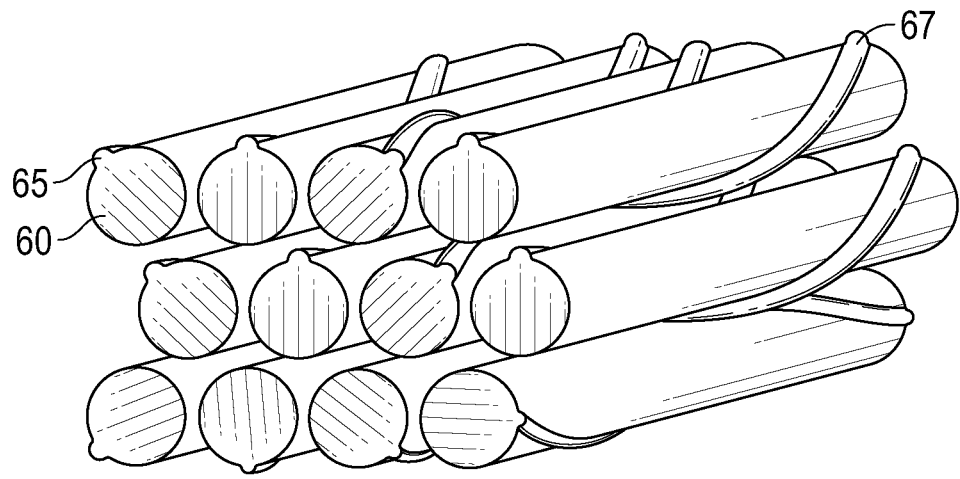
FIG. 9 is a perspective view of an assembly of rods that includes the rod shown in FIG. 8 and other similar shaped rods.

FIG. 8 shows another rod 60 having a generally round cross-sectional shape with a protrusion 65. The rod 60 is twisted such that the protrusion 65 forms a raised ridge 67 that spirals around rod 60. As can be seen in FIG. 8, distance y from the outermost surface portion 69 of protrusion 65 to the centre of the rod 62 is greater than distance x from a surface portion 68 to the centre of the rod 62. An assembly of rods 60 each having a raised, spiral ridge 67 is shown in FIG. 9. Such an assembly of rods results in spacing without bunching together which would restrict the migration of water.

It will be appreciated that rod 60 could have more than one protrusion 65 and that the shape and size of the protrusion(s) can be varied.

It will also be appreciated that other rod profiles that are not round can be twisted to create channels for the collection and transport of water.

Figure 10A:
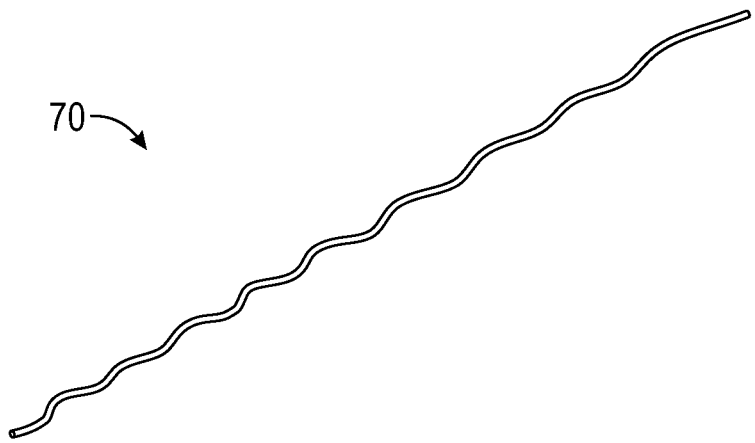
FIG. 10A is a perspective view of a crimped rod according to a seventh embodiment of the invention.
Figure 10B:
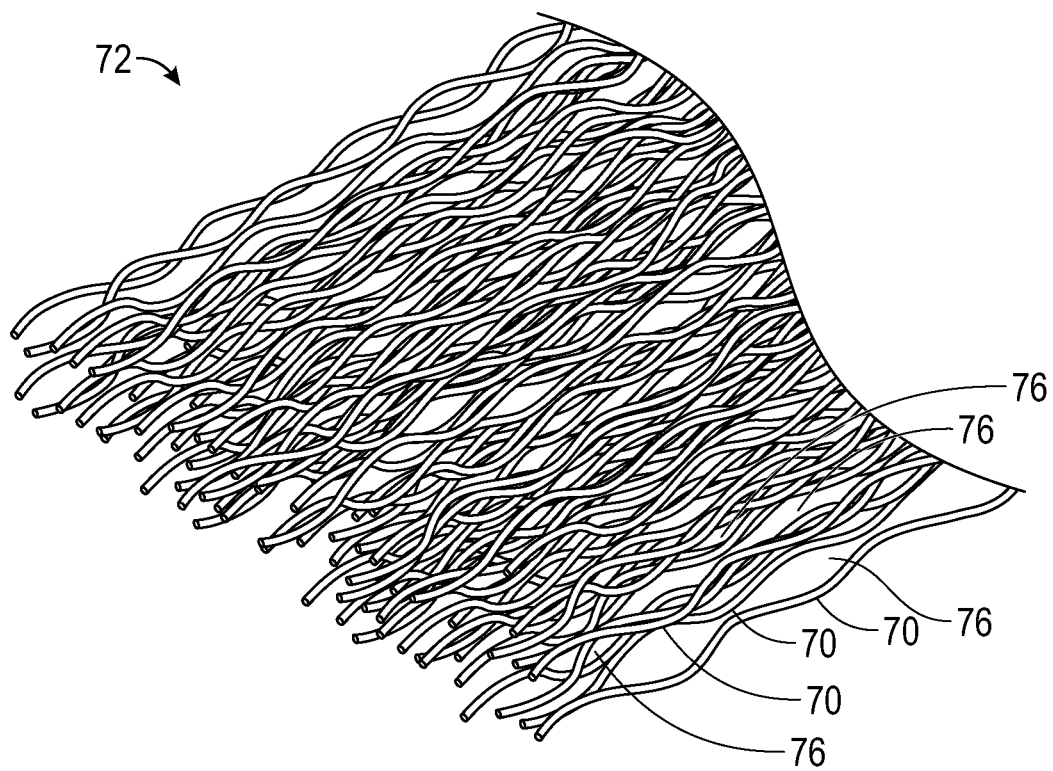
FIG. 10B is a perspective view of an assembly of crimped rods that includes the rod shown in FIG. 10A and other similar shaped rods.

Pockets and channels can also be created between rods by utilizing crimped rods. For instance, FIG. 10A shows crimped rod 70 and FIG. 10B shows an assembly 72 of crimped rods 70. As a result of the crimping, spaces 76 are formed between adjacent rods 60 to provide a space for the collection and transport of water.

The possible choices of shapes, styles, and size of rods is infinite. However, it will be appreciated that the desired rods are a continuous shaped filament that create, in conjunction with like copies of itself, a network of spaces and channels into which water can rise and be held by capillary action and which can also act as conduits for the transport of water. The rods of the present invention can be manufactured and installed in a variety of ways.

Uniquely shaped and sized rods, when acting together horizontally, vertically, and at various angles create a network of cavities and channels through which water can be collected and transported, limited only be the natural capillary rise of the water. The addition of a cover forms an effective water management unit which does not clog over time.

The inventor has tested an assembly of round rods (i.e. rods having a circular cross section). The round rods bunched together and almost no water penetrated the assembly. Similar bunching is also predicted for other straight (untwisted) rod shapes, such as rods having square or oval cross-sections.

An assembly of twisted rods having a non-circular cross-section will result in spaces and channels for water to be collected and for migration to occur. However, depending on the shape of the twisted rods, the ratio of mass to spaces between rods may be undesirable and require a large and needless consumption of raw materials in manufacture. For this reason, rods having shapes with several long, narrow extensions and with large gaps between such extensions are desirable. The star-shaped rod 10 shown in FIG. 1A and the I-shaped rod 1 shown in FIG. 3A are examples of such desired shapes.

The smaller the diameter of a capillary tube is, the smaller the channels for water will be and the higher the capillary rise will be. This is also true in soils. Soils with a small particle size display a larger capillary fringe since the pore space is smaller and water will rise higher. The principle can be applied to effectively match the drainage network to the specific application and conditions. The rods and network can be sized and shaped according to the soil type and application. For instance, the rods may have a 6 mm profile with thin walls around 0.5 mm to 0.75 mm thick.

Flexibility of the components and network has application in drainage, as a passive filter, and as underground irrigation. The following are several different assemblies and applications of the rods of the present invention.

Assembly A—Rods Laid in a Trench

Figure 11:
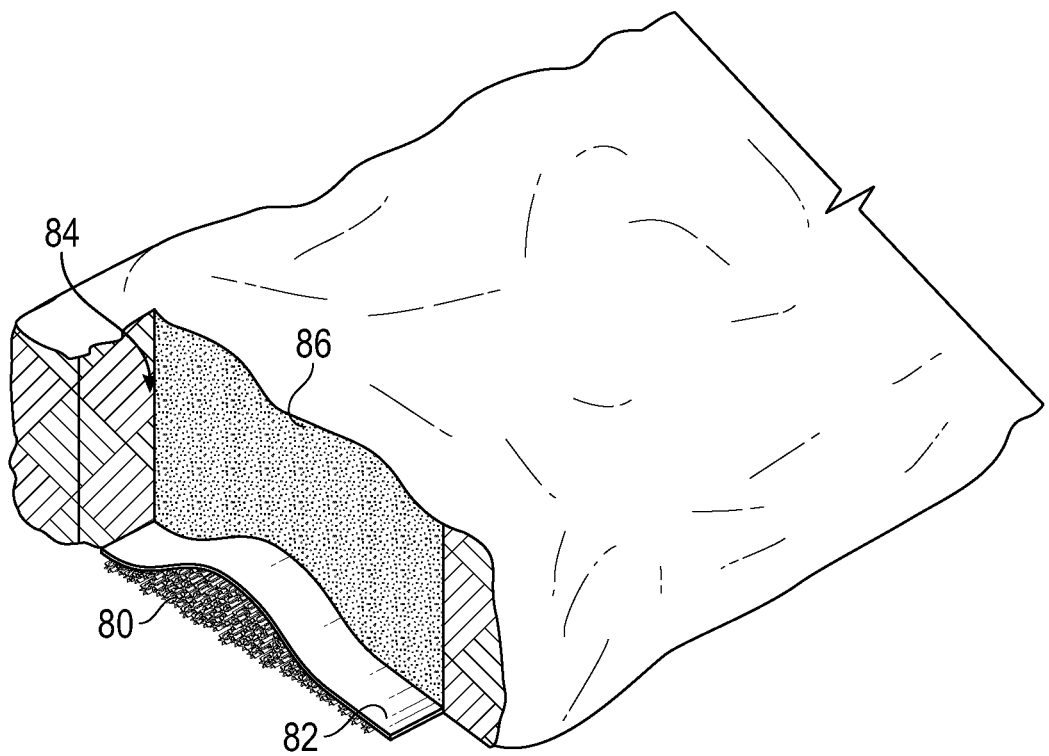
FIG. 11 is a schematic diagram showing rods placed in a trench.

FIG. 11 shows the use of rods 80 within a trench (referred to herein as Assembly A).

Assembly A contains the two elements: (a) rods 80 shaped for the capillary collection of water and placed parallel and adjacent to each other; and (b) a cover 82 to block soil particles above the rods 80. As only clean (soil free and debris free) water rises by capillary action up through the rods 80, the gaps/channels in and between the rods 80 will remain free from soil particles and therefore stay unclogged.

The rods 80 are laid down from a discharge point along the bottom of a sloped trench 84, and in a thickness required for the conditions (approximately 10-25 millimetres thick). A cover 82 is placed loose over the rods. The cover 82 can be a geotextile, a plastic sheet, or any other suitable material. The trench 84 is backfilled and the backfill material 86 consolidates the installation. Provided the trench 84 has a minimal slope, installation will be straightforward requiring little skill, time, and effort. The rods 80 are simply placed in the trench 84, covered, and then the trench is backfilled.

Assembly A is suitable for applications where water conditions are not severe and long runs before discharge are acceptable. The trench size and thickness of the rods can be matched to the drainage conditions. Installations would normally be performed by a trencher since the width and depth are easy to control, and the speed of trenching is very fast. Typical installations may be agricultural drainage, casual sports fields, park area, etc.

Once installed, it is unlikely that the assembly could be compressed or crushed to a point of lost performance. The structure is supported through its entirety and the structure itself is flexible and conforms to most shapes.

Plant roots do not offer a significant risk to drainage. Should a penetration occur, the network would simply divert the water around the obstruction. In the case of an irrigation application, the penetration and root access to the water is a unique benefit.

Since intimacy with the soil enhances performance, there is no need for drain rock or other components typically required in other drainage solutions. Instead, the rods 80 are laid directly over the earth at the bottom of the trench.

The inventor has tested Assembly A with star-shaped rods 10 as shown in FIG. 1A. In the test, the length of the assembly was 35 meters. First, a trench was dug that was exactly the same as any typical installation, with the exception of enlarged areas spaced each 5 meters. Water was applied to the enlarged areas to determine the migration speed. After the rods were laid, the trench was backfilled to complete the installation.

In the test, the migration rate was 1 meter per minute with a discharge rate of 6.2 liters per minute. On a later date, a heavy rainstorm occurred. Monitoring the assembly immediately after the rain produced identical results to the earlier test which confirmed the high performance of the shaped rods and their transport capability over moderate distances. The test area was observed for weeks and the inventor noticed a significant improvement in drainage. Additionally, the discharge water was very clean.

Assembly B—Pipes with Slots

Figure 12:
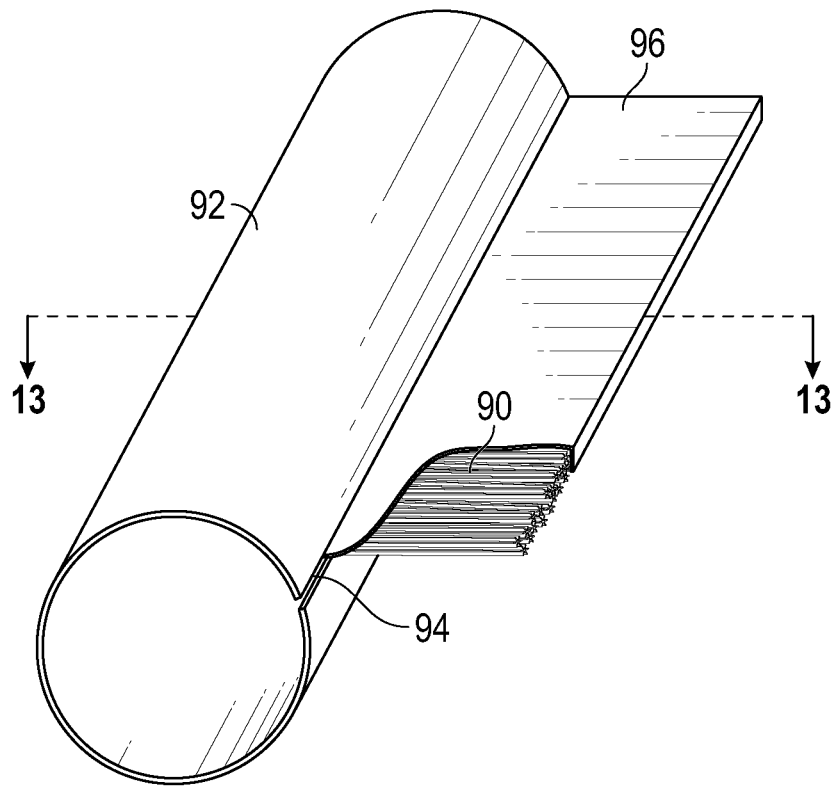
FIG. 12 is a perspective view of a pipe with an assembly of rods.
Figure 13:
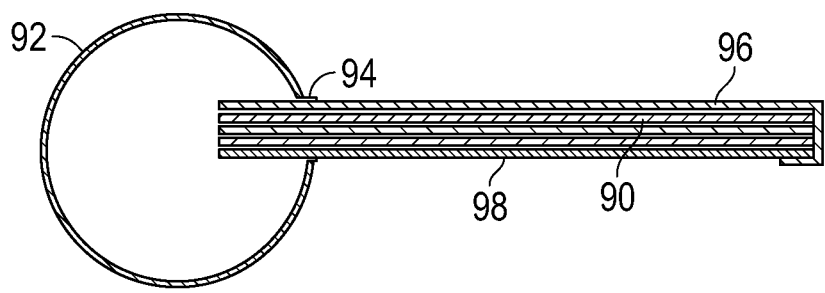
FIG. 13 is a cross-sectional view of the pipe and assembly of rods shown in FIG. 12 taken along line 13-13.

FIGS. 12 and 13 show the use of rods 90 with a pipe 92 (referred to herein as Assembly B).

Assembly B utilizes relatively short lengths of parallel rods 90 (in the range of 75-200 millimetres) that discharge into a pipe 92 through a slot 94. However, depending on the soil conditions, slopes, and anticipated rainfall, longer lengths of rods 90 can be used. The rods 90 are covered along the top with a cover 96, but open along the bottom surface 98 (as shown in FIG. 13). Cover 96 may also extend over the sides and ends of rods 90. Water in the soil adjacent to the bottom surface 98 is collected by the rods 90 and transported into the pipe 92.

The collection assembly may extend for the entire length of the pipe 92. After collection, there is a very short transit time before discharge into the pipe 92, resulting in rapid drainage speeds.

Assembly B is suitable for extreme water conditions where fast drainage speeds are desirable. Typical installations may be golf bunkers and rain harvesting applications.

A short length of 80 centimetres of the assembly produced a flow rate of 30 litres per minute, far greater than the ability of any native soil to supply water for collection (hydraulic conductivity).

Whenever the capacity of the drainage assembly surpasses the hydraulic conductivity of the soil, the test becomes more soil testing than assembly testing. However, installed assembly testing is a much better indication of performance than laboratory testing of a sample.

When testing, the inventor used a sieved, clean sand with a high hydraulic conductivity rating (higher than any native soil), however, the limiting factor in the system was still the hydraulic conductivity of the soil.

The inventor also tested Assembly B using 70 centimeter lengths of the star-shaped rods 10 shown in FIG. 1A and using 70 centimeter lengths of the crimped rods 70 shown in FIG. 10A. The results of both were nearly identical, with a measured discharge rate of approximately 30 litres per minute. As native soils cannot provide this volume of water at the collection point, the results are only related to the capacity of the assembly. In reality since Assembly B was so efficient, the limiting factor for drainage will be the hydraulic conductivity of the soil.

Assembly C—Prefabricated Units

Figure 14:
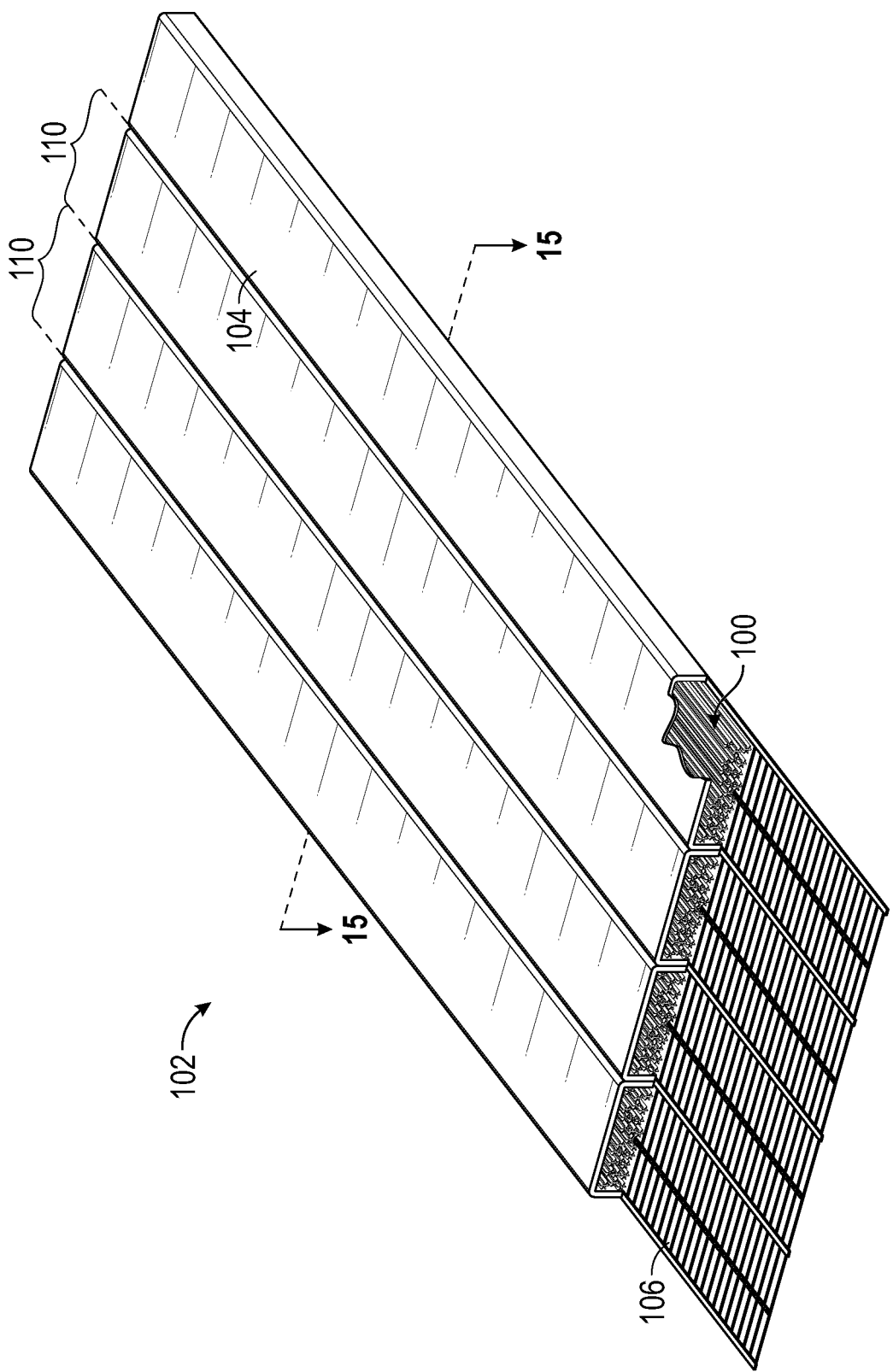
FIG. 14 is a schematic diagram of a manufactured assembly of rods.

FIGS. 14 and 15 show the use of rods 100 in a segmented and prefabricated unit 102 (referred to herein as Assembly C).

The cover 104 is bonded to a bottom mesh 106 at each and every point 108 where they coincide, forming fillable segments 110 which eliminate bunching and displacement of the rods 100 during handling.

The mesh 106 binds the assembly without restricting the water access to the rods 100.

Assembly C may take different forms ranging from one segment 110 to any practical number of segments 110 depending on the application and water conditions.

Assembly C can act in different ways; it can be a single unit installed vertically, horizontally, or at an angle, or it can constitute the collection assembly for a pipe network installed horizontally, vertically, or at an angle.

A single unit in a continuous length, in one or multiple segments, can be placed in a sloped trench originating at the discharge point, acting as both the collection mechanism as well as the transport conduit. There is no assembly, tools, or skill required to place the unit. In this configuration, the assembly functions the same as the assembly of rods placed in a trench (Assembly A above), except that it is prefabricated, and the cover is already installed. Backfilling completes the installation.

Because it is prefabricated, Assembly C can also be cut to any length and installed directly into a pipe network with a simple adapter. In this case, the primary function of Assembly C is a collection mechanism, transferring water into a pipe network. The number of transfer points are dictated by the water conditions and applications, similar to the pipe network to be discussed below.

The multilayered construction allows Assembly C to be flexible but semi-rigid, and it is not susceptible to bending failure or "U" joint failure wherein water pools at the point of the failure. Since this construction also expands the collection and transportation capability, the increased capacity is often well above the ability of the soil to provide enough water to reach capacity, resulting in fewer units and lower costs.

As mentioned above, installation can be horizontal, vertical, or at an angle. For instance, the assembly may be installed vertically behind a retaining wall to eliminate hydrostatic pressure behind the wall. Depending on the soil conditions and water accumulation, assemblies spaced at 1 metre intervals behind retaining walls may provide effective drainage.

Assembly C can be considered an upgraded replacement for prior art drainage belts. The assembly can be installed similarly in all applications. The functioning principles are also similar. However, Assembly C is not plagued with the problems of insufficient capacity and the poor transport characteristics of such prior art drainage belts. Errors due to installation and workmanship are also avoided due to the ease and simplicity of installing Assembly C.

Assembly D—Rods Bound in a Pipe-Like Structure to Collect Water (Drilled Applications and Weep Holes)

Figure 16C:
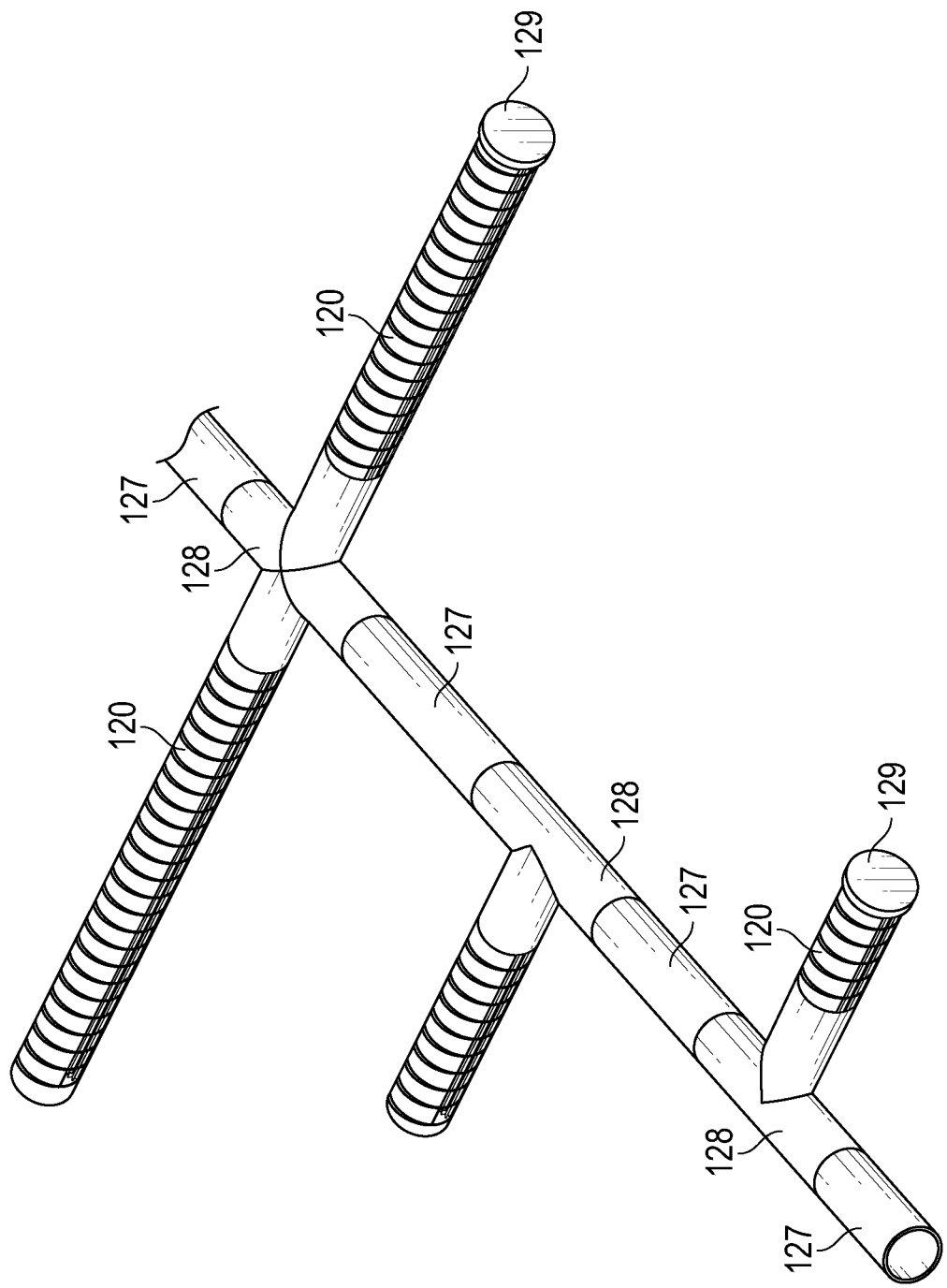
FIG. 16C shows a pipe connected to four assemblies of water collection and water transportation rods of various lengths according to the embodiment shown in FIG. 16A.

FIGS. 16A and 16B show a pipe-like structure 120 (referred to herein as Assembly D). Assembly D can be arranged in a pipe network as shown in FIG. 16C.

Assembly D consists of a series of rods 122 arranged in a round shape. A cover 124 is applied to the top portion of the series of rods and the rods 122 and cover 124 are then wrapped with a filament 126. While filament 126 extends around the complete circumference of the series of rods 122, cover 124 does not cover the underside of Assembly D to allow the lower rods to directly contact the ground.

Wrapping binds the components in the desired shape while allowing the unit to maintain flexibility. Different diameters may be consistent with standard pipe sizes. The leading end of Assembly D may be used as the discharge point (free standing or inserted into a pipe network) while the free end is sealed (or otherwise blocked) to prevent particles from entering the assembly.

A single unit in a continuous length can be placed in a sloped trench originating at the discharge point. The unit acts as both a collection mechanism and as a transport conduit. At the site of installation, there is no assembly, tools, or skill required. The Assembly D pipe-like structures act in the same manner as the Assembly A rods laid in a trench and the Assembly C prefabricated units.

Referring now to FIG. 16C, Assembly D can be cut to any length and act as a collection mechanism for use in a pipe network. Functionally, this is identical to Assembly C. The pipe-like structures 120 can be inserted directly into standard fittings 128 to connect with pipes 127 of most pipe networks without fear of bending failures or "U" joint issues. As noted above, free ends 129 are sealed (or otherwise blocked) to prevent the entry of particles that may lead to clogging.

The combination of pipes for transportation and Assembly D for collection represents an efficient drainage system in modular form. It is a "snap together and cover up" system. There is no requirement for preparation, tools, or skill.

The speciality of Assembly D is for drilled applications where other methods are impractical. Assembly D can be installed directly, and in varying lengths, into a horizontally drilled hole for dewatering slopes for the prevention of landslides.

Assembly D can also be installed though a retaining wall to reduce hydrostatic pressure from water accumulation. Excavation for the purpose of installing or repairing drainage with this type of application is either impractical, too costly, or both. A drilled application is the only reasonable option.

Weep holes in retaining walls are standard practice, but it is rare to actually observe water exiting the holes. With time, silt blocks the weep holes. Assembly D can repair and improve the performance of such weep holes. A hole drilled into the slope though the existing weep hole will allow Assembly D to be inserted to a suitable depth to restore drainage function.

While it may appear that the different assembles are similar and interchangeable, this is not necessarily true. Assembly D is not as efficient as Assembly A and Assembly C when placed in a horizontal configuration in a low water supply application. The reason is that Assembly A and Assembly C have a larger surface area facing down (i.e. facing the rising water table) and in contact with the soil. While the assemblies can be somewhat interchangeable, one assembly may be easier to install or may perform better than another assembly in different applications and in different water conditions.

Assembly E—Rods Bound in a Pipe-Like Structure to Dispense Water (Irrigation Applications)

A passive gravity system using capillary to water beneath the surface could almost totally eliminate loss of water to evaporation and watering indiscriminate areas. A reduction in water consumption by 90% is not unrealistic.

Figure 17A:
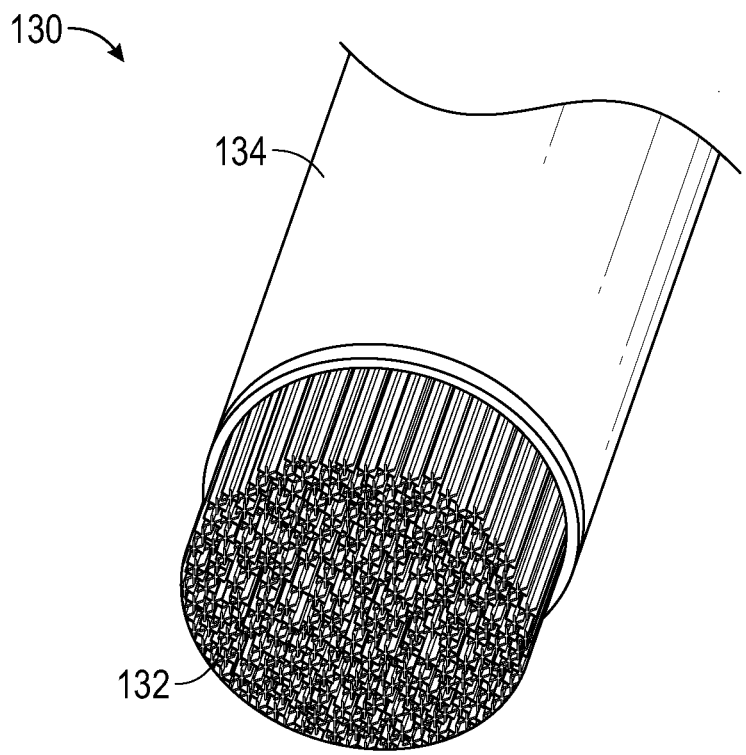
FIG. 17A is a perspective view of another assembly of rods having an impermeable cover.
Figure 17B:
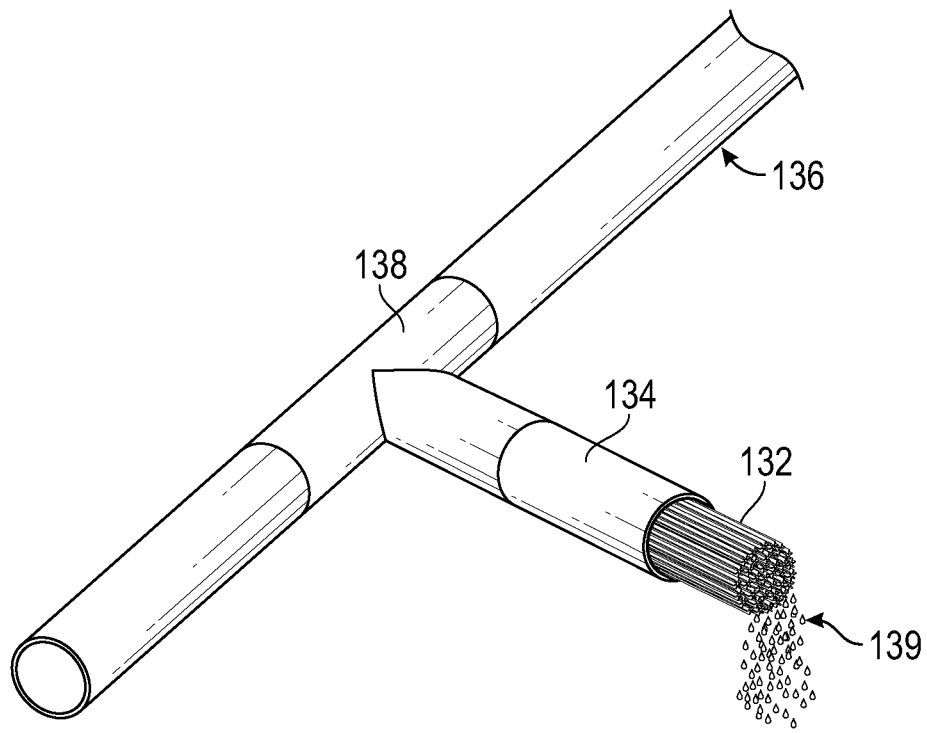
FIG. 17B shows a pipe connected to the assembly of rods shown in FIG. 17A.

FIGS. 17A and 17B shows an alternate pipe-like water structure 130 that may be used to dispense water in irrigation applications. Shaped rods 132 are arranged in a round shape and wrapped completely with a cover 134. The pipe-like water dispensing structure 130 may be connected to water supply lines 136 using pipe fittings 138. As shown in FIG. 17B, a substantial amount of water 139 is released from the system at the open ends of rods 132.

Assembly E is one assembly that may be used for transferring water from a supply pipe 136 (shown in FIG. 18) into the soil by capillary action. An unwrapped end of Assembly E can be inserted directly into the supply pipe fitting. Units are sized to match the conditions and application in conjunction with standard pipe sizes. The water is dispersed throughout the cavities and channels created by the rod network, through the geotextile, and into the soil by capillary action in all directions.

Generally, Assembly E with a geotextile cover (or another permeable cover) is suitable for installation in a raised bed application where planting is in rows. Installation below the seeded area encourages the roots to seek water from below, resulting in a well-developed root system.

After harvesting, the assembly can be extracted and rolled for storage and reuse.

Another assembly for transferring water from the supply pipe into the soil by capillary utilizes an impermeable cover instead of a geotextile cover. One end is inserted into the supply pipe 136 while the other end is used to disperse water into the soil by capillary action in a more concentrated fashion. In addition, the rod network can also be extended into the soil for any desired distance. Clogging is not a concern since the movement of water creates a flushing condition.

The use of Assembly E as shown in FIG. 17A with cover 134 being a non-permeable cover is suitable for installation into the root system of large plants and trees where a more concentrated and larger volume of water is desirable. This application is usually permanent although the assembly can be arranged for future root growth. Some shifting of the rod network by growing roots will not substantially affect the network.

Figure 18:
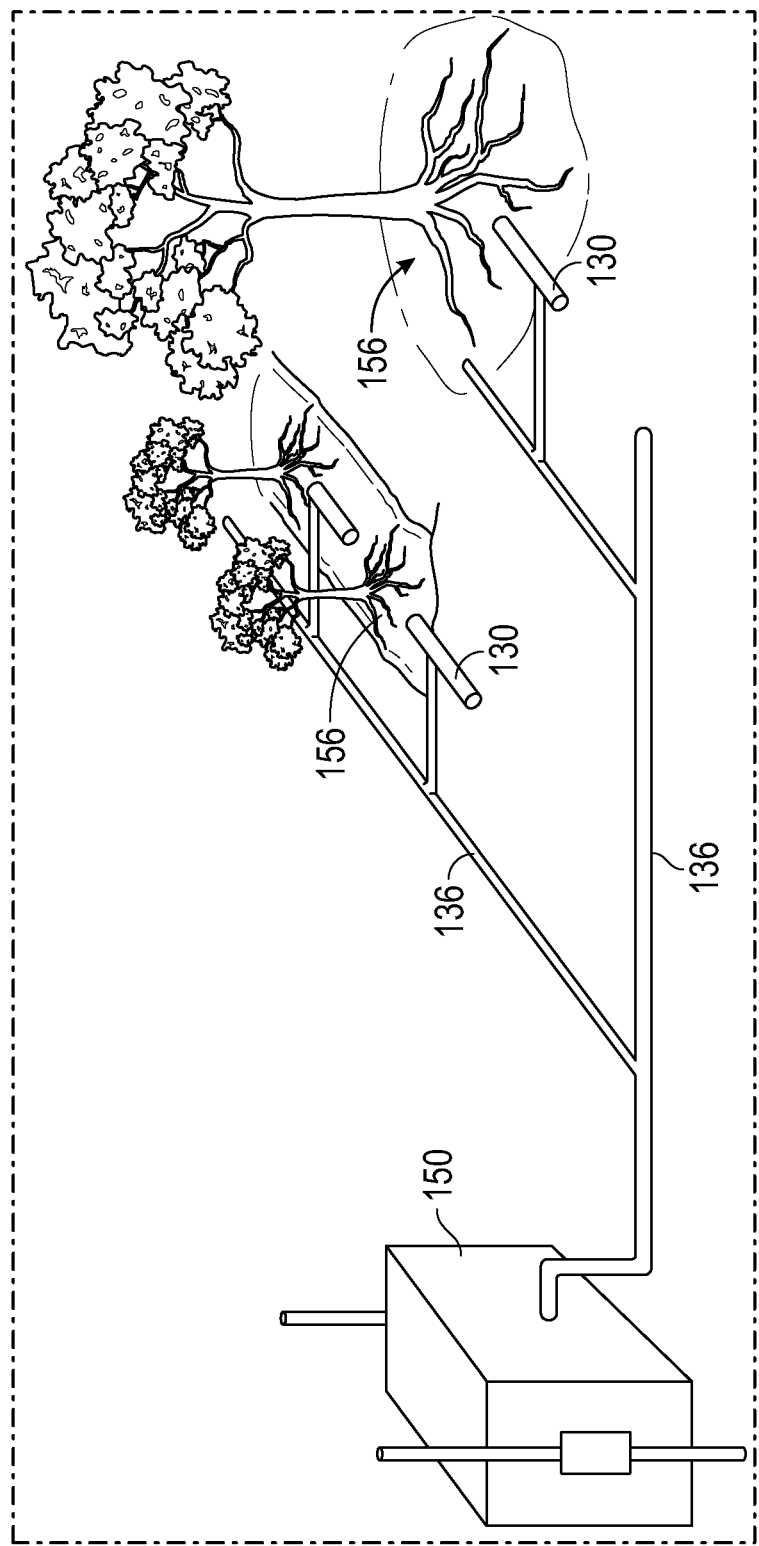
FIG. 18 is a schematic diagram of an irrigation system.

FIG. 18 shows an example of a passive gravity system where the height of the water source 150 is adjustable to provide a desired amount of water flow into the supply pipes 136. Alternatively, the water source can be any low pressure water supply. The supply pipes 136 can be rigid or flexible, buried or simply laid on the surface, and can be connected with standard industry fittings.

The pipe-like water dispensing structures 130 (Assembly E) utilizing rods 132 as shown in FIGS. 17A and 17B are connected to the supply pipe system and installed below the surface, directly onto the root zone 156. The water dispensing structures 130 varies with the type of vegetation, application, and water requirements. It is installed using standard industry pipe fittings and with a slight slope in the required direction. Water is dispensed below the surface and directly into the root zone 156. There are no clogging issues since the water flow is from a clean supply, outward (opposite from the standard configuration of a soil filtered application).

The dispensing portion of a passive capillary irrigation system comprises two main components: (a) a rod network 132; and (b) a container/wrapping 134. Different shapes of containers, partial containers, wrapping and container combinations can be substituted, however, the basic structure and principles do not change. As with rod shapes and sizes, it is not practical to detail all possible combinations; it is preferable to define the structure and principles as applying to the other possible combinations.

Primary Filter Application

The rods may also be used in a filtering application for industries which collect water such as desalination plants. In many countries, water bottling companies use groundwater as their source (wells), and together with industrial application use, the water table has dropped at alarming rates. Governments are therefore restricting groundwater pumping in many locations.

A solution is to take water from a river, pipe it into a sand bed on the land, and then collect it with the rod assemblies discussed above. The assemblies may also be placed directly in the river with many branches feeding a central pipe. This will act to filter course particles and debris.

Alternately, a river could feed a settling pond, the water would then go through a sand bed where capillary and gravity would clean the water further.

Sediment-free water can then be collected using rods assemblies after it has filtered through the sand bed and such water may be further treated for drinking.

Further Testing

The performance of any drainage product is dependent on the area available for collection referred to herein as the "open area". Perforated pipe systems have slots cut through the pipe wall. If the slots are too large, then soil particles will enter and accumulate within the perforated pipe systems and result in clogging. The resulting clogged perforated pipe system may have an open area that is typically only 2-3% of the surface area. In a 4-inch diameter pipe, this represents approximately 15 square inches per meter available for water collection. The reason draining pipes are usually a large diameter is because they need the surface area to increase collection capability. Testing of this type of perforated pipe system in sand only produced a discharge rate of 7.8 litres per minute for a 4-metre section of pipe.

Other products, such as the drainage belt disclosed in U.S. Pat. No. 5,934,828 to Hu et al., have a collection area that is more than four times greater than perforated pipe systems. However, such drainage belts are limited by the small size of their micro channels. A test done by the inventor in sand only produced a discharge rate of 2 litres per minute per belt. This system therefore relies on adding multiple belts together to increase the capacity of the system.

The present invention which utilizes shaped rods also has a large collection area. The entire bottom of various assemblies of rods are open and exposed to the ground for water collection. While similar to the drainage belt in the collection method and size of the collection area, the present invention is not limited by small micro channels. Instead, water can rise between the layers of shaped rods. Additionally, the shaped rods are a very capable transport mechanism for the collected water. Adjacent rods in an assembly cooperate in both the collection and transport functions so the performance is not limited to the size of channels. These factors combine to deliver an efficient drainage system with high collection capability, with high transport and discharge capability, and that is resistant to clogging and blockages.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

The invention claimed is:

1. An assembly for collecting water, transporting water, or dispersing water, said assembly comprising a series of rods configured for capillary action aligned parallel and in contact with one another to create a network of channels between said series of rods for the collection, transportation, or dispersion of water by capillary action;

wherein each rod comprises at least one opening;

wherein the series of rods are stacked randomly in the assembly;

wherein each rod comprises a plurality of longitudinal extensions to maintain at least one gap configured for capillary action between adjacent rods to provide a hollow space for water to travel along the series of rods via capillary action;

wherein the plurality of extensions is disposed within the hollow space such that the hollow space assumes a non-uniform volume;

wherein a size of the hollow space is manipulated by a size and a formation of the plurality of extensions; and wherein the series of rods are partially interlocked via the plurality of extensions.

2. The assembly of claim 1 further comprising:
a cover placed over said series of rods; and
backfill placed over said cover;
wherein said series of rods, said cover, and said backfill are placed in a trench.

3. The assembly of claim 1 further comprising:
a pipe having a slot; and
a cover over at least a top of said series of rods;
wherein at least a portion of said series of rods passes through said slot in said pipe.

4. The assembly of claim 3 wherein said series of rods comprises:
a side; and
an end that is outside of said pipe;
wherein said cover extends over said side and over said end.

5. The assembly of claim 1 further comprising:
a mesh; and
a cover connected to said mesh along at least two lengths of said cover and said mesh so as to create at least one fillable segment between said mesh and said cover; wherein said series of rods are within said at least one fillable segment.

6. The assembly of claim 1 further comprising a cover over said series of rods and wherein said assembly is cylindrical in shape.

7. The assembly of claim 6 further comprising a filament wrapped around said cover and said series of rods.

8. The assembly of claim 6 wherein a bottom portion of the series of rods is uncovered.

9. The assembly of claim 6 wherein said cover is a cover selected from the group consisting of a geotextile cover and an impermeable cover.

10. The assembly of claim 1 further comprising a cover that wraps around a length of said series of rods and wherein said assembly is cylindrical in shape.

11. The assembly of claim 5 wherein said assembly is connectable to a pipe using a standard pipe fitting.

12. The assembly of claim 10 wherein said assembly is connectable to a pipe using a standard pipe fitting.

13. The assembly of claim 1 wherein said water enters said assembly from below said assembly by capillary rise.

14. The assembly of claim 1 wherein each of said rods comprises:
a cross-sectional shape that extends along a length of said rod, said cross-sectional shape comprising:
a centre;
a first surface portion a first distance from said centre; and
a second surface portion a second distance from said centre, wherein said second distance is greater than said first distance.

15. The assembly of claim 1 wherein each of said rods has crimps along a length of each said rod.

* * * * *